United States Patent Office 3,794,682
Patented Feb. 26, 1974

3,794,682
HYDRATION OF NITRILES
William Austin Barber, Stamford, Conn., assignor to American Cyanamid Company, Stamford, Conn.
No Drawing. Filed Dec. 1, 1970, Ser. No. 94,197
Int. Cl. C07c 103/08
U.S. Cl. 260—561 N                           6 Claims

ABSTRACT OF THE DISCLOSURE

Heterogeneous catalysts for amide synthesis by hydration of a nitrile with water comprise oxide of cobalt and mixed metal oxides of cobalt and another metal selected from iron, aluminum, zinc, calcium, manganese and mercury. A preferred method of making the catalyst is to coprecipitate the mixed metals as oxalates then decompose with heat. A 50% cobalt 50% manganese mixed oxide is a preferred catalyst for hydration of acrylonitrile to make acrylamide.

---

The invention relates to catalytic processes for hydration of nitriles to make amides. For example, acrylonitrile and water are reacted in liquid solution and in presence of a solid heterogeneous catalyst to produce acrylamide.

Several different processes have been described that employ heterogeneous catalysts for the hydration reaction of nitriles with water in liquid dispersion or solution. For example, U.S. Pat. No. 3,366,639, patented Jan. 30, 1968 to Louis R. Haefele, describes the hydration of about 50 different nitriles using manganese dioxide catalyst. The process conditions of the present invention vary considerably from those described in most of the examples of that patent. Haefele obtained good yields of amide using a solution of the nitrile in a non-aqueous liquid solvent, using only the water or hydration in manganese dioxide as the H$_2$O reactant. We have found, as was suggested by Haefele, that the same reaction proceeds with the nitrile in aqueous solution in presence of solid manganese dioxide. However, in order to maintain sustained catalytic activity for long periods in aqueous solutions using solid manganese dioxide catalyst, it was found necessary to operate the reaction in aqueous dilute acid solution at or below pH 3.0. The acid reaction medium however, dissolves more of the solid manganese dioxide catalyst with consequently faster catalyst loss. The present invention provides a process using solid mixed metal oxide catalysts which can be operated in aqueous solutions at pH in the range from about pH 1 to pH 7 and beyond, but which is operated to best advantage at or about neutral pH without the need for acid to maintain prolonged catalyst activity. Thus the catalyst loss is greatly reduced. Catalysts of this invention are stable in air, have extremely low rates of catalyst loss to the liquids in neutral aqueous solutions and, in preferred embodiments of the invention, produce good conversion of nitrile to amide without significant byproduct formation.

According to the invention, the hydration of a nitrile in aqueous solution to produce the corresponding amide is carried out in presence of a solid heterogeneous catalyst which consists essentially of unsintered cobalt oxide or unsintered mixed metal oxides in which the total metals comprise from about 40 up to 100 mole percent oxide of cobalt. In the mixed metal oxide embodiments, the second metal is selected from the group consisting of iron, aluminum, zinc, calcium, manganese and mercury. In some embodiments there may be minor amounts of oxides of metals other than the first and second metals, present in the mixed oxide usually in amounts not exceeding about 10–20 mole percent of the total metals. A preferred method for preparing the unsintered, solid cobalt oxide or mixed metal oxide catalyst is first to precipitate cations of the defined cobalt and other metal or metals when used, in the selected proportions from a single mixed aqueous solution, as insoluble salts of those metals, and then to form a cobalt oxide or mixed metal oxide by drying and decomposing the resulting salt precipitate with heat in presence of oxygen, e.g. in air, at temperature selected to be high enough to accomplish the oxidative decomposition but below the sintering temperature of the catalyst components.

The process of the invention is useful for catalytic hydration of any suitable nitrile and a particularly preferred nitrile is acrylonitrile which is hydrated to make acrylamide by the catalytic process. The process is particularly amenable for hydration of water-soluble nitriles such as acetonitrile, acrylonitrile and the like, but it can be used for other nitriles that can be solubilized in aqueous solution by means of a solubilizing agent such as dioxane or the like. Suitable nitriles for the process may be selected, for example, from the extensive list of nitriles described in the aforementioned U.S. Pat. No. 3,366,639.

The percent concentration of nitrile in the reaction mixture is preferably in the range from about 6 percent to about 95 percent by weight based on total weight of nitrile and water. Conversions can be obtained beyond those limits, within the scope of this invention, but the reaction rate and conversion will be reduced accordingly. When a two-phase mixture is used it is desirable to keep the two phases intimately mixed as by constant agitation.

The concentration of the solid heterogeneous catalyst for optimum conversion in the liquid reaction mixture usually will be in the range from about 15% to about 50%, weight for weight based on total liquids. In a continuous process the catalyst contact time for optimum conversion may vary over a broad range depending on other selected operating conditions and the selected nitrile. For optimum operation contact times usually will occur in the range from about 20 min. to about 3 hrs.

The hydration will proceed at temperatures in the range from about 20° C. or below to about 250° C. and the most preferred temperatures usually will fall in the range from about 50° C. to about 150° C. The only requirement with regard to pressure is that when the reaction is to be carried out in liquid phase, the pressure must be sufficient to maintain the reaction mixture in liquid state at the selected reaction temperature but higher pressures can be used as desired. Although liquid phase reactions are generally preferred, hydration of nitriles to amides in the vapor phase using the heterogeneous catalysts described, would be within the scope of the invention.

The particular reaction conditions for optimum operations of the hydration process may vary to some extent depending upon the selected nitrile but usually will fall within the preferred ranges recited.

The cobalt oxide and mixed metal oxide catalyst may be prepared by any suitable method. The oxide catalyst is preferably unsintered, and this seems to be necessary at least for the optimum catalytic effect from any of the cobalt oxides or mixed metal oxides, based on the observation, when the catalysts are heated beyond sintering temperatures, of decrease in catalytic activity and in some instances more byproducts, as compared with equivalent catalysts prepared at lower decomposition temperatures.

A preferred method of making the catalyst is to dissolve soluble salts of the selected catalyst metals, i.e. a soluble salt of cobalt with a soluble salt of the other selected metal or metals in aqueous solution, and then to co-precipitate the metals as insoluble salts by the addition of a soluble salt or acid having an anion that will combine and precipitate the selected catalytic metals and that will decompose to form the oxide. A preferred anion for the precipitating action is the oxalate ion which is suitable for precipitating cobalt as well as all of the defined other metals. Oxalate may be added as oxalic acid or as a soluble oxalate salt such as ammonium, sodium or potassium oxalates or the like. Other anions that can be used for precipitating mixed metals from solution include formate, acetate, carbonate, hydroxide and the like.

The mixed metal oxalate or other solids are removed from the liquid, washed, dried and then gently heated in presence of oxygen, as in air, to effect the oxidative decomposition. A preferred method for heating to decompose is to heat the solids in an oven at about 125° C. for periods from several hours to about five days, depending on the particular material and the temperature used, with air available to the heated solids in the oven. It is preferred to avoid sintering of the solids, and it is also preferred to avoid heating at unnecessarily high temperature or for unnecessarily long periods beyond the temperature and time needed for the oxidative decomposition. The catalyst product preferably is in form of finely divided solid particles having high surface area greater than 100 sq. meters per gram and preferably about 200–300 m.$^2$/gm.

Following are specific examples including detailed description of the presently most preferred mode of carrying out the invention. Other embodiments within the scope of the invention may vary in several respects from specific detail of these examples.

EXAMPLE 1

Catalyst preparation (A) Forty grams manganese chloride hydrate $MnCl_2 \cdot 4H_2O$ dissolved in 400 ml. water is precipitated by adding 37.5 grams potassium oxalate $K_2C_2O_4$ dissolved in 150 ml. water. The white precipitate, manganese oxalate, is filtered, washed and dried at room temperature.

(B) The procedure is repeated except half the manganese chloride (20 grams) is replaced by an equimolar amount (24 grams) of cobalt chloride. The mixed oxalate precipitate is pink.

(C) The procedure is repeated except all of the manganese chloride is replaced by 48 grams cobalt chloride. The cobalt oxalate precipitate is pink.

The dried precipitates from A, B and C above are separately decomposed in air at 165° C. Decomposition times ranged from about 3 days to about 3 weeks. The oxide products from A, B and C are all finely divided black powders and catalysts B and C have surface area in the range from about 200 to about 300 square meters per gram.

Amide synthesis

The oxides prepared in A, B and C above are tested separately as catalysts, each in a batch process using 0.3 gram acrylonitrile and 5 grams deionized water with pH adjusted when necessary with nitric acid to the values shown in Table 1. One gram of the oxide is added and the reaction is carried out at 57° C. for one hour. For comparison with the co-precipitated catalyst B, a 50–50 mixture of catalysts A and B was tested. Results are tabulated in Table 1.

TABLE 1

| Catalyst | Decomposition temperature, ° C. | pH | Conversion acrylonitrile to acrylamide— 1 hr., 57° C., percent |
|---|---|---|---|
| A. 100 Mn | 165 | 3 | 7.4 |
| B. 50 Co, 50 Mn | 165 | 2 | 22 |
| B. 50 Co, 50 Mn | 165 | 3 | 23 |
| B. 50 Co, 50 Mn | 165 | 7 | 24 |
| C. 100 Co | 165 | 7 | 32.0 |
| 50% A, 50% C | | 7 | 10.5 |

EXAMPLE 2

Several metal oxide catalysts are prepared as in Example 1 by first precipitating mixed metal oxalates from the chloride salts of cobalt and another selected metal in aqueous solution in the molar proportions of metals, as described in Table 2. The precipitates are then decomposed in air at the temperatures shown in Table 2. Surface area measurements are made on several of the catalysts in Table 2 and those catalysts tested have measured surface areas ranging from 159 to 280 sq. meters per gram. The mixed oxide catalyst products are tested in the amide synthesis described in Example 1, using deionized water with no added acid in all instances. Percent conversion of acrylonitrile to acrylamide is shown in Table 2 for each test.

TABLE 2

| Mole percent | | | Decomposition temperature, ° C. | Conversion acrylonitrile to acrylamide— 1 hr., 57° C., percent |
|---|---|---|---|---|
| Cobalt | Second metal | Third metal | | |
| 99 Co | 1 Fe | | 165 | 35–25 |
| 90 Co | 10 Fe | | 165 | 30–15 |
| 90 Co | 10 Al | | 200 | 25 |
| 90 Co | 10 Zn | | 200 | 25 |
| 90 Co | 10 Ca | | 165 | 22 |
| 90 Co | 10 Hg | | 165 | 16 |
| 90 Co | 10 Mg | | 165 | 10 |
| 100 Co | | | 165 | 32 |
| 90 Co | 10 Mn | | 165 | 30 |
| 80 Co | 20 Mn | | 165 | 20 |
| 70 Co | 30 Mn | | 165 | 19 |
| 60 Co | 40 Mn | | 165 | 19 |
| 50 Co | 50 Mn | | 165 | 20–25 |
| 40 Co | 60 Mn | | 165 | 16 |
| 30 Co | 70 Mn | | 165 | 10 |
| 20 Co | 80 Mn | | 165 | 4 |
| 10 Co | 90 Mn | | 165 | 3 |
| 45 Co | 45 Mn | 10 Cu | 165 | 16 |
| 45 Co | 45 Mn | 10 Fe | 165 | 22 |

In all of the foregoing examples the hydration reaction was carried out in batch processes for making acrylamide from acrylonitrile. The process of this invention is useful also for hydration of nitriles other than acrylonitrile and because of the heterogeneous solid catalyst and liquid reactants, the process is readily adaptable to continuous processing.

EXAMPLE 3

The powdered oxide catalysts B prepared in Example 1 (50 Co-50 Mn) is used as a packed bed in a tubular reaction vessel mounted in a constant temperature bath at 70° C. Inlet and outlet connections for circulation of liquids through the bed are provided and a solution of 50% by weight of acetonitrile (pH 7.5) in water is pumped slowly through the bed with a contact time of about 1 hour. For the purpose of this specification I define contact time as catalyst void volume divided by liquid feed volume per hour. Initially 17.1% of the acetonitrile is converted to acetamide, declining gradually to 7.6% after 300 hours continuous operation. No other products are detected by gas chromatographic analysis.

One object of the invention is to provide solid catalysts that are effective for nitrile synthesis, and in particular for acrylonitrile synthesis, and that can sustain effective catalyst activity in neutral aqueous solutions over a period of several hours of continued use. A disadvantage with manganese dioxide catalysts, particularly for the hydration of acrylonitrile, was that in the neutral aqueous solutions the catalyst activity would decline quite rapidly as the catalyst was used continuously over a period of three or four hours. The sustained catalyst activity of manganese dioxide for hydration of acrylonitrile, could by improved by carrying out the reaction in acid (pH 1–pH 3) aqueous solutions, but the acid solution had the disadvantage that it would increase elution of the solid catalyst into the solution to such extent that solid catalyst loss became a very considerable economic factor.

The cobalt-containing metal oxide catalysts of the present invention have the advantage over the manganese dioxide catalysts that they can sustain catalyst activity for hydration of acrylonitrile in neutral aqueous solutions over a period of several hours significantly better than do the manganese dioxide catalysts. Some of the most preferred cobalt-containing catalyst, e.g. 50 cobalt 50 manganese, have been operated for up to 6 hours continuously in neutral aqueous solutions as catalysts for hydration of acrylonitrile with practically no decrease in catalyst activity.

EXAMPLE 4

Batch reaction mixtures are made using catalysts prepared by the method described in Example 1 but having relative mole percentages of metals as shown in Table 3. Each reaction mixture contains one gm. of the selected solid catalyst, 300 mg. acrylonitrile and 5 grams deionized water. The reactions are run at 70° C. constant temperature, without acid, for 6 hours and samples are withdrawn periodically for analysis. The values tabulated in Table 3 describe the number of milligrams acrylonitrile found to have been consumed, cumulatively, at the end of each period as samples are withdrawn. These values are used to account for all acrylamide present, both as monomer and in the small amounts of polyacrylamide produced. Practically all nitrile conversion is to acrylamide and some polmerization may occur. For comparison, two control reactions are run using, respectively, two different purchased manganese dixoide, $MnO_2$, powders as catalyst.

From the values shown in Table 3 the first order kinetic curve for each reaction is derived. This curve, shows changes in catalytic activity throughout the reaction period. For the 50 Co-50 Mn catalyst, a first order curve derived from data in Table 3 is the only straight line. This demonstrates that there is practically no decrease in catalyts activity with the 50 Co-50 Mn catalyst. The data in Table 3 indicate sustained catalyst activity (at 6 hours) is better in every case with any of the cobalt and mixed metal oxides than with either of the manganese dioxide catalysts.

TABLE 3.—MILLIGRAMS ACRYLONITRILE CONSUMED
[300 mg. at start]

| Catalyst, mole percent | 1 hr. | 2 hr. cum. | 4 hr. cum. | 6 hr. cum. |
|---|---|---|---|---|
| 90 Co, 10 Fe | 163 | 200 | 238 | 248 |
| 90 Co, 10 Al | 143 | 169 | 206 | 214 |
| 90 Co, 10 Zn | 135 | 172 | 217 | 225 |
| 100 Co | 154 | 199 | 233 | 260 |
| 90 Co, 10 Mn | 154 | 194 | 237 | 252 |
| 80 Co, 20 Mn | 105 | 150 | 187 | 221 |
| 50 Co, 50 Mn | 115 | 174 | 246 | 276 |
| Sedema label, $MnO_2$ | 127 | 153 | 183 | 208 |
| Synthox label, $MnO_2$ | 74 | 107 | 135 | 152 |

EXAMPLE 5

Batch reaction mixtures are prepared and reacted as in Example 1, using as catalysts respectively, the Catalyst B from Example 1 and two different purchased manganese dioxide, $MnO_2$, powders. Separate batches were prepared with each catalyst having pH values, respectively, of pH 1, pH 2, pH 3 and the ambient pH in deionized water, about pH 6.5 to pH 7. After each batch had reacted at 57° C. (exceptions noted on table) for one hour the catalyst solids were separated and the liquid was analyzed for organic and inorganic components. The procedure was then repeated in each instance for a second one hour reaction cycle using fresh reactants but the same catalyst and then again the same for a third one hour cycle. Data tabulated in Table 4 show the percent conversion of acrylonitrile to acrylamide and illustrate the degree of metal oxide elution in each cycle, with each catalyst, at each selected pH value. The value in parts per million of manganese and cobalt found in solution indicates the relative catalyst losses in each of the respective reactions. The mixed metal oxide maintains catalyst activity at all pH values tested while the manganese dioxide does so only at acid pH where catalyst loss is rapid. At neutral pH, where catalyst loss is least, the manganese dioxide declines rapidly in catalyst activity but the mixed metal oxide sustains its activity rather well throughout the test.

TABLE 4

| | | Percent conversion | | | Soluble metals, p.p.m. | | | | | |
|---|---|---|---|---|---|---|---|---|---|---|
| | | | | | 1st cycle | | 2d cycle | | 3d cycle | |
| pH | Catalyst | 1st cycle | 2d cycle | 3d cycle | Mn++ | Co++ | Mn++ | Co++ | Mn+ | Co++ |
| 1 | GMO, $MnO_2$ | 21.3 | 19.4 | 18.6 | 360 | | 2,400 | | 3,000 | |
| | Synthox, $MnO_2$ | 22.8 | 23.0 | 20.4 | 2,480 | | 2,460 | | 2,370 | |
| | Co·₅Mn·₅ oxide | 17.8 | 20.6 | | 300 | 2,000 | 1,000 | 2,950 | | |
| 2 | GMO, $MnO_2$ | 13.4 | 10.9 | 14.4 | 16 | | 5 | | 6 | |
| | Synthox, $MnO_2$ | 14.6 | 15.3 | 14.5 | 360 | | | | | |
| | Co·₅Mn·₅ oxide | 21.0 | 22.8 | 21.3 | | | | | | |
| 3 | Synthox, $MnO_2$ | ¹33.3 | ¹21.8 | ¹14.9 | 86 | | 48 | | 34 | |
| | Co·₅Mn·₅ oxide | 23.8 | 23.8 | 23.3 | <20 | <40 | <20 | <40 | <20 | <40 |
| 6.5 ambient | Synthox, $MnO_2$ | 19.6 | 15.9 | 10.6 | 38 | | 20 | | 16 | |
| | Co·₅Mn·₅ oxide | 26.0 | 23.5 | 23.5 | <4 | <8 | <4 | <8 | <4 | <8 |

¹ 70° C. (90 minutes).

I claim:

1. A process comprising hydration of acrylonitrile to acrylamide with water in presence of solid catalyst consisting essentially of mixed oxides of at least 40 mole percent cobalt and from 40 to 60 mole percent of manganese at hydration reaction temperature in the range from about 20° C. to about 250° C.

2. A process defined by claim 1 wherein the defined catalyst consists essentially of the metal oxides prepared by precipitating cobalt and manganese, in selected proportions within the defined ranges from aqueous solution as insoluble salts of said metals, and subsequently decomposing the metal salt precipitate to metal oxide by heating in presence of oxygen at elevated temperature in the range from about 125° C. to about 250° C.

3. A process defined by claim 2 wherein said insoluble mixed salts are insoluble mixed metal oxalates.

4. A process defined by claim 2 wherein the molar proportions of cobalt and manganese in the defined catalyst is about 50 mole percent cobalt and about 50 mole percent manganese.

5. A process defined by claim 1 wherein the defined hydration reaction is carried out in liquid phase, with pressure sufficient to maintain the reactants in said liquid phase.

6. A process comprising hydration of acrylonitrile to acrylamide with water in presence of a solid catalyst at hydration reaction temperature in the range from about 20° C. to about 250° C. at pressure sufficient to maintain the reactants in liquid phase, said solid catalyst consisting essentially of mixed metal oxides prepared by coprecipitating about 50 mole percent cobalt and about 50 mole percent manganese from aqueous solution as insoluble oxalates of those metals and decomposing said oxalates by heating in presence of oxygen at temperature in the range from about 125° C. to about 250° C.

References Cited

UNITED STATES PATENTS 3,670,021 6/1972 Goetz et al. _____ 260—561 R
3,499,879 3/1970 Kobayashi et al.
　　　　　　　　　　　　260—561 NXR

FOREIGN PATENTS 551,869 6/1932 Germany _____ 260—561 R

LEWIS GOTTS, Primary Examiner

E. G. LOVE, Assistant Examiner

U.S. Cl. X.R.

252—471; 260—561 R